No. 646,935. Patented Apr. 10, 1900.
J. ADAIR.
PNEUMATIC TIRE FOR WHEELS.
(Application filed Mar. 28, 1899.)
(No Model.) 2 Sheets—Sheet 1.
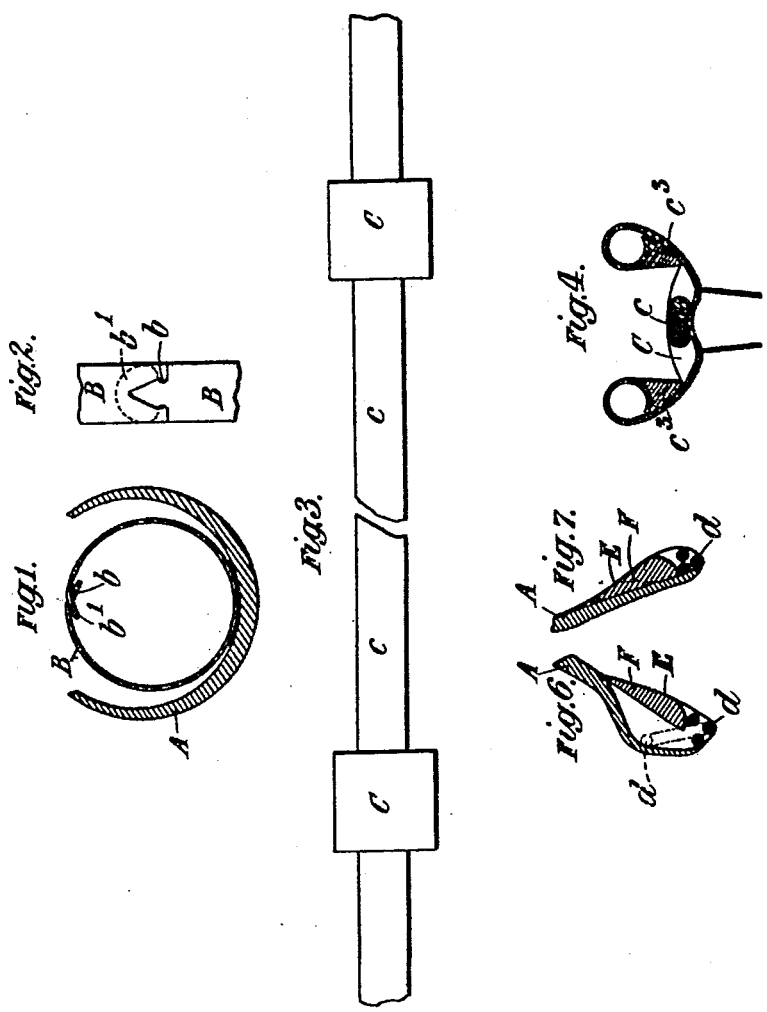
Witnesses:
Anna L. Hodgdon.
E. A. Allen.
Inventor:
John Adair
by James Hamilton
Attorney

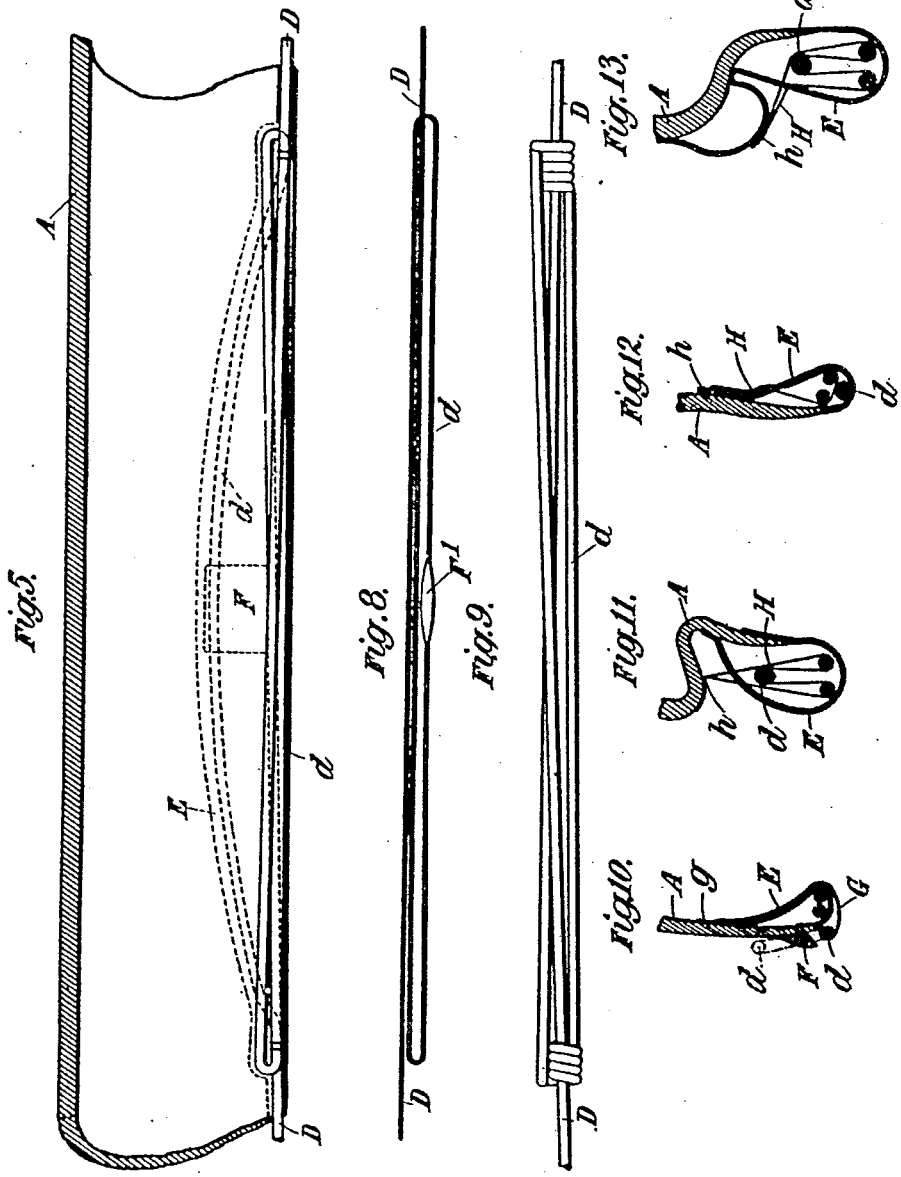

UNITED STATES PATENT OFFICE.

JOHN ADAIR, OF WATERFORD, IRELAND.

PNEUMATIC TIRE FOR WHEELS.

SPECIFICATION forming part of Letters Patent No. 646,935, dated April 10, 1900.

Application filed March 28, 1899. Serial No. 710,772. (No model.)

*To all whom it may concern:*

Be it known that I, JOHN ADAIR, baker, a subject of the Queen of Great Britain, residing at Waterford, Ireland, have invented certain new and useful Improvements in Pneumatic Tires for Wheels and Arrangements in Connection with such Wheels, of which the following is a specification.

The object of this invention is to facilitate the fitting to and removal of pneumatic tires from wheel-rims.

An important feature of my invention consists in providing means for preventing the air-tube being nipped between the edge of the outer cover and the rim.

A further important feature of my invention relates to a spring device interposed in the wire coil at the edge of the tire-cover, whereby the said wire coil is permitted to expand or lengthen when the cover is being placed in position on the rim or removed therefrom. To increase the elasticity of the coil, more than one such device may be interposed.

In order that my invention may be clearly understood and readily carried into effect, I will proceed to describe the same more fully with reference to the accompanying drawings, in which—

Figure 1 is a cross-section of the outer cover of a pneumatic tire provided with means to prevent the inner tube being nipped between the edges of the said cover and the wheel-rim. Fig. 2 shows the method of connecting the ends of the supporting-band shown in Fig. 1. Fig. 3 is a plan of the blocks and their connecting-band which I place in the wheel-rim. Fig. 4 is a cross-section of a wheel-rim having the blocks and connecting-band in position. Fig. 5 is a longitudinal section of a tire-cover, showing the wire spring in the edge thereof. Figs. 6 and 7 are cross-sectional views of one edge of an outer cover, showing the position of the spring when the tire is deflated and inflated, respectively. Figs. 8 and 9 are views of the wire springs detached from the cover. Fig. 10 is a cross-sectional view of one edge of a tire-cover, showing a modified form of spring. Figs. 11, 12, and 13 are cross-sectional views of one edge of a tire-cover, showing another modification of spring.

Referring to Figs. 1 and 2, A is the outer cover of a pneumatic tire. B is an elastic band attached at or about its center to the inside of the tread of the cover A. One end of the band B has a slot or eye $b$ formed therein, and the other end thereof is provided with a broad tongue $b'$, having a narrow neck. Any required number of these elastic bands are placed at intervals in the cover A and are passed around the inner air-tube, the ends of each band being connected by passing the tongue $b'$ through the eye or slot $b$, so that the said slot engages with the neck of the tongue, as shown in Fig. 2. The air-tube is thus supported and is consequently less liable to be nipped between the edges of the cover and the wheel-rim.

Referring to Fig. 3, C C are blocks of soft india-rubber which are connected by a band $c$, preferably of rubber, and placed in the wheel-rim, as shown in Fig. 4. $c^3$ are internal rubber facings running around this rim. I may employ eight or more of these blocks C in each rim. Upon these blocks C the edges of the cover A rest previously to and during inflation, and the wire-spring device hereinafter described is placed in a space between two contiguous blocks. If preferred, the blocks C may each be fixed in the rim, when the band $c$ would not be required. When the tire is deflated, the edges of the cover A are at liberty to move into the spaces between the soft-rubber blocks C toward the bed of the rim, and the wire coil D is thus enabled to more easily contract under the influence of the spring $d$, hereinafter described. When inflation takes place, however, the inflation-pressure moves the edges of the cover A outward from the bed of the rim and in degree closes the wire coil on the said soft-rubber blocks.

Referring to Figs. 5, 6, and 7, $d$ is a spring formed by bending the wire D, which surrounds the edge of the outer cover, into a loop, as shown, for example, in Fig. 8 or Fig. 9. E is a pocket formed in the cover A for the reception of said spring $d$. F is a solid piece or bead attached to said pocket. The pocket E prevents the spring $d$ arching too much when operated, as hereinafter explained, and the ends of the spring $d$ are secured to said pocket, preferably by stitching, so as to maintain it in position, but at the same time to permit it to arch when required. When the tire is deflated and a strain is put upon the wire D in order to remove the edge of the cover from or place it in the rim, the spring $d$ arches, as shown in dotted line in Figs. 5 and 6, and thereby permits the wire D, which passes around the edge of the cover A, to stretch or increase in length, and thus facilitates the removal of the said cover from or the placing of it in the rim. When the tire is inflated, the air-pressure secures the edges of the cover firmly in the rim by tightening the cover, which closes the pocket E and presses the wires D against the rim, thus preventing the spring $d$ from arching out of its normal position. The internal pressure of the air also forces the bead F firmly against the cover A, as shown in Fig. 7, thus causing said bead to act as an additional security to check any possible tendency of the spring $d$ to move out of its normal position. I may also place a bead or enlargement, such as F', Fig. 8, on the spring $d$ as an additional security to prevent the said spring from arching when the tire is inflated.

Referring to Fig. 10, the wire coil D passing around the edge of the tire is so bent that the spring-wire $d$ lies at the side of and not below the coil, as in the preceding figures. The spring-wire $d$ is in this case placed outside the cover A and between the said cover and the rim of the wheel. E is the pocket formed in the tire-cover and through which the wire coil passes. F is the solid piece or bead, which may be now placed on the outside of the cover A. As another means for securing spring-wire into its required position, G is a flap of canvas or other suitable inelastic material, one end of which is attached to the spring-wire $d$ and the other end of which is attached at $g$ to the inside of the cover A. When the tire is inflated, the air-pressure maintains the flap G in the position shown in the figure, and thus acts as an additional security to prevent the spring-wire G from arching. The dotted lines in this figure show the position assumed by the spring $d$ when the edge of the cover is stretched for removal or fitting on.

Referring to Figs. 11 and 12, A is the cover, and E the pocket through which the wire coil passes. The spring-wire $d$ is preferably formed as shown in Fig. 8 or Fig. 9. H is a flap of cord, tape, or other suitable material, the ends of which are attached at $h$ to the cover A and which, entering the pocket E through an opening therein, is passed around the spring-wire $d$ and the bends of the wire coil, as shown, or, if preferred, the ends of the flap H may be attached to a loop of inextensible material secured to the inside of the cover, as shown in Fig. 13. This loop yielding when the tire is deflated allows the spring to readily arch. When the tire is deflated, the spring-wire $d$ is capable of arching, as shown in Fig. 11; but when the tire is inflated the air-pressure retains the flap H in the position shown in Fig. 12, so that the said flap acts as an additional security to prevent any tendency of the spring-wire $d$ to arch.

Care must be taken when attaching the tire to the rim to place the spring between two contiguous blocks C, so as to give the said spring more freedom to lie below the wire coil D. When attaching the cover to the rim, the spring should be placed in position first; but when taking off the cover from the rim the spring should be removed last.

What I claim, and desire to secure by Letters Patent of the United States, is—

1. In a pneumatic tire, the combination with the cover, of elastic bands for holding the air-tube in position, the said bands being attached to the inside of the tread of said cover, substantially as described.

2. In a pneumatic tire the combination with the cover, of bands of elastic material for supporting the air-tube attached to the inside of the tread of said cover, a slot or eye in each of said bands at one end and a broad tongue connected to the other end of each of said bands by a narrow neck, substantially as described for the purpose specified.

3. In a pneumatic tire an arching spring inside the pocket edge of such tire, in combination with the wire coils encircling such edge, substantially as described.

4. In a pneumatic tire an arching spring inside the pocket edge of such tire—in combination with the wire coils encircling such edge—means for securing said springs in position—and pockets in said cover which inclose and limit the arching movement of said springs—substantially as described.

5. In a pneumatic tire, the combination with the cover and the wheel-rim, of soft-rubber blocks placed at intervals in the wheel-rim and a band connecting said blocks, substantially as described.

6. In a pneumatic tire—an arching spring inside the pocket edge of such tire—in combination with the wire coils encircling such edge—means for securing said springs in position—and pockets in said cover, which inclose and limit the arching movement of said springs—and beads or solid pieces attached to said pockets to insure that the spring will not arch, when the tire is inflated—substantially as described.

7. In a pneumatic tire—an arching spring inside the pocket edge of such tire—in combination with the wire coils encircling such edge—means for securing said spring in position—and pockets in said cover which inclose and limit the arching movement of said springs—and beads or enlargements on each spring—substantially as described—and for the purpose specified.

8. In a pneumatic tire the combination with the cover, of wire coils in the edges of said cover, pockets in the edges of said cover through which the wire coils pass, a spring interposed in each of said wire coils and formed integrally therewith, flaps of inextensible material having their edges at one extremity secured to the wire springs and their edges at the other extremity secured to the cover, substantially as described for the purpose specified.

9. In a pneumatic tire the combination with the cover of wire coils in the edges of said cover, a spring interposed in each of said wire coils and formed integrally therewith, pockets in the cover to receive and limit the movement of said springs, means for securing said springs in position, and flaps of inextensible material which enter the said pockets pass around said springs and have their ends secured outside the pockets to the inside of the cover, substantially as described, for the purpose specified.

10. In a pneumatic tire the combination of the cover, wire coils in the edges of said cover, soft-rubber blocks placed at intervals in the wheel-rim, and a spring interposed in each of said wire coils and formed integrally therewith, substantially as described for the purpose specified.

11. In a pneumatic tire the combination of the cover, wire coils in the edges of the cover, soft-rubber blocks placed at intervals in the wheel-rim, a spring interposed in each of said wire coils and formed integrally therewith, pockets in the cover to receive and limit the movements of said springs, means for securing said springs in position and means serving as an additional security to prevent the spring contracting when the tire is inflated, substantially as described for the purpose specified.

In testimony whereof I have hereunto set my hand, in presence of two subscribing witnesses, this 13th day of March, 1899.

JOHN ADAIR.

Witnesses:
BENJAMIN SMALLWOOD,
HENRY HERBERT OLIVER.